United States Patent Office 3,136,744
Patented June 9, 1964

3,136,744
FLUOROTHIIRANES, THEIR PREPARATION AND HOMOPOLYMERS THEREOF
Frank C. McGrew, Wilmington, Del., assignor to E. I. du Pont de Nemours and Company, Wilmington, Del., a corporation of Delaware
No Drawing. Filed Apr. 14, 1961, Ser. No. 102,951
11 Claims. (Cl. 260—79)

This invention relates to a new class of polyfluorinated cyclic sulfides. More particularly, it relates to a new class of polyfluorothiiranes, their preparation, and their polymers.

Few examples are known of thiiranes, that is, of compounds (which may also be called 1,2-episulfides) containing the three-membered heterocyclic structure

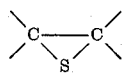

No fluorine-substituted thiiranes have been described, in spite of the continuously increasing scientific and technical interest in fluorine-containing organic compounds, and no method has been reported for preparing thiiranes of this type.

It has now been found that certain 2,2-difluoro-3,3-disubstituted thiiranes can be prepared and that these compounds can give polymeric materials by opening of the thiirane rings.

This invention provides a new class of products, the 2,2-difluorothiiranes of the general formula

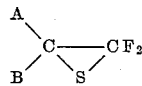

where A and B represent fluorine, chlorine or a polyfluoroalkyl radical which may be perfluoroalkyl, ω-chloroperfluoroalkyl or ω-hydroperfluoroalkyl. The invention also comprises the polymers of these 2,2-difluorothiiranes, including their copolymers with other polymerizable monomers.

The monomeric 2,2-difluorothiiranes are prepared by a process which comprises bringing in contact, at a temperature within the range of 150 to 500° C., hexafluoropropylene-1,2-epoxide and a thiocarbonyl compound of the general formula

where A and B have the above-stated significance, and recovering the resulting 2,2-difluorothiiranes. The polymeric products of this invention are prepared by subjecting the 2,2-difluorothiiranes, alone or in admixture with other polymerizable monomers, to polymerization conditions under the influence of free radical-producing initiators.

The reaction which takes place in the process of preparing the monomeric 2,2-difluorothiiranes is represented by the equation

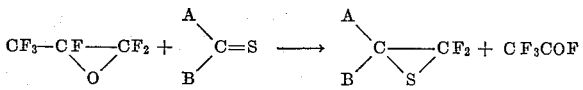

As shown in this equation, trifluoroacetyl fluoride is also produced in this reaction. Other by-products may be formed in variable amounts, among which perfluorocyclobutane, the cyclic dimer of tetrafluoroethylene, is often present.

One of the starting materials in this process is hexafluoropropylene-1,2-epoxide. This material can be prepared by oxidation of hexafluoropropylene with alkaline aqueous hydrogen peroxide, preferably at temperatures between —50 and +50° C. An illustrative example of this method follows:

Into a reaction vessel was charged 750 ml. of methanol, 84 g. of potassium hydroxide dissolved in 150 ml. of water, and 525 ml. of 30% hydrogen peroxide. To the mixture was added 80 ml. of liquid hexafluoropropylene and the mixture was agitated at —40° C. for 1.5 hours. There was isolated 62.8 g. of gaseous reaction product containing 35% of unreacted hexafluoropropylene and 65% of hexafluoropropylene-1,2-epoxide. The latter can be obtained pure by gas chromatography methods. It is a gas boiling at —30±1° C. It is characterized by a strong infrared absorption band at 6.43 microns.

The other starting material is a thiocarbonyl compound of the formula

where A and B, which may be alike or different, stand for fluorine, chlorine, a perfluoroalkyl radical, an ω-chloroperfluoroalkyl radical or an ω-hydroperfluoroalkyl radical (for the sake of brevity, radicals of this class will be referred to hereinafter as polyfluoroalkyl radicals). Thus, the thiocarbonyl compound can be one of the following:

(1) Thiocarbonyl fluoride, $CF_2S$; thiocarbonyl chlorofluoride, $CFClS$; or thiocarbonyl chloride, $CCl_2S$. The last named compound, also called thiophosgene, is available commercially. Thiocarbonyl chlorofluoride can be prepared as described by Yarovenki and Vasil'eva in Journal of General Chemistry, USSR, 29, No. 11 November 1959, 3754–57 (English translation). It boils at about 9° C. Thiocarbonyl fluoride can be prepared by the method described in U.S. Patent 2,962,529. It is a gas boiling at about —54° C.

(2) The polyfluorothioacyl chlorides of the formula

where A is a polyfluoroalkyl radical as defined above. These compounds may be prepared by bringing in contact with the vapors of boiling sulfur a fluorochloroalkane of the formula $A—CCl_3$. The reaction is preferably carried out at atmospheric pressure, where the reaction temperature is about 445° C., while removing the volatile polyfluorothioacyl chloride from the reaction zone as soon as it is formed. Examples of polyfluorothioacyl chlorides of this class are

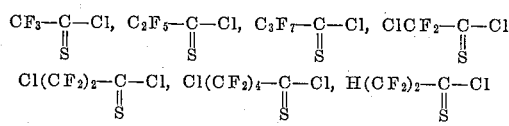

and

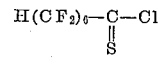

(3) The polyfluorothioacyl fluorides of the formula

where A is a polyfluoroalkyl radical as defined above. These compounds, some of which have been reported in the literature, may be prepared by fluorination with antimony trifluoride of the polyfluorothioacyl chlorides mentioned under (2) above, or by dehydrofluorination, by means of sodium fluoride, of the mercaptans formed by addition of hydrogen sulfide to polyfluoroolefins. Still another method comprises contacting a fluoroalkylmercury compound of the formula $(A—CFX)_2HG$, where X is hydrogen, chlorine or fluorine, with molten sulfur or phosphorus pentasulfide at a temperature above 400° C. Examples of polyfluorothioacyl fluorides of this class are

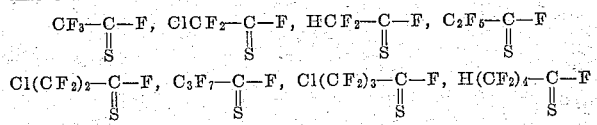

and

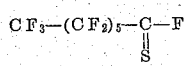

(4) The di(polyfluoroalkyl)thioketones of the formula

where A and B, which may be alike or different, are both polyfluoroalkyl radicals as defined previously (i.e., perfluoroalkyl, ω-chloroperfluoroalkyl or ω-hydroperfluoroalkyl). These compounds may be prepared as described in U.S. Patent 2,970,173. Examples of suitable di(polyfluoroalkyl)thioketones of this class are

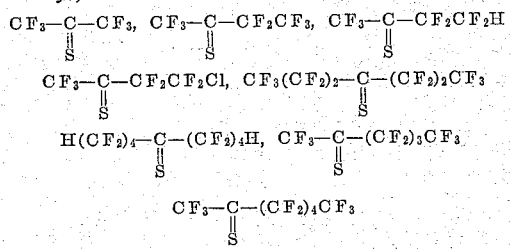

and

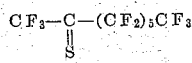

The preferred thiocarbonyl reactants of the classes defined above under (2), (3) and (4) are those in which the polyfluoroalkyl group or groups, that is, the perfluoroalkyl, ω-chloroperfluoroalkyl or ω-hydroperfluoroalkyl radicals A or A and B, as the case may be, have from 1 to 6 carbon atoms. An especially preferred thiocarbonyl reactant for use in this process is thiocarbonyl fluoride, since it leads to tetrafluorothiirane, also called tetrafluoroethylene episulfide,

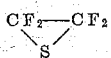

which is a particularly useful product of this invention.

The reaction between the thiocarbonyl compound and hexafluoropropylene epoxide is carried out by bringing the two reactants in contact at a temperature and for a time sufficient to permit formation of at least some of the corresponding 2,2-difluorothiirane. For a practical reaction rate, a temperature of at least 150° C. is required. When using short contact times and reduced pressures, for example under conditions of continuous operation, the temperature can be as high as 500° C. Preferably, the reaction is conducted within the range of 175 to 400° C. It will be understood, of course, that reaction temperature and contact time are to a large extent interdependent and can be varied with respect to one another for best results, taking into account the thermal stability of the thiocarbonyl reactant. Thus, with the more stable reactants such as the thiocarbonyl halides and the polyfluoroacyl halides, better yields are generally obtained with relatively long contact times (e.g., 1–5 hours, preferably 2–4 hours) at relatively low temperatures (e.g., 175–225° C.), the operation being most conveniently conducted in closed vessels under the autogenous pressure developed by the reactants or, if desired, under higher pressures, for example up to 5000 atmospheres, provided by an inert gas such as nitrogen. With the thermally sensitive thioketones, it is generally preferred to use short contact times, e.g., of the order of 1 to 60 seconds, with correspondingly higher temperatures, of the order of 200–500° C. and preferably 250–400° C. This can be done, for example, by passing a mixture of the two reactants, with or without an inert carrier gas, through a heated glass or metal tube, if desired packed with contact substances such as quartz rings, at a pressure which is preferably the atmospheric pressure but can be lower, e.g., as low as 1 mm. of mercury, or somewhat higher, e.g., up to 5 atmospheres. If necessary, the effluent mixture can be recycled as needed to improve the yield, as is often done in continuous operations of this kind. This procedure can also be used with the more thermally stable thiocarbonyl reactants, if desired.

The relative proportions of the two reactants are not critical. Although the process may be represented by an equimolar reaction between the thiocarbonyl compound and the hexafluoropropylene-1,2-epoxide, such a ratio is by no means essential. In practice, there is generally used between about 0.2 mole and about 2 moles of thiocarbonyl compound per mole of hexafluoropropylene epoxide.

The 2,2-difluorothiirane formed in this process can be recovered from the crude reaction product in any appropriate manner. Most conveniently, it is separated from the by-products and unchanged starting materials by fractional distillation. Vapor phase chromatography can also be used, with or without preliminary distillation. As already noted, some prefluorocyclobutane is often formed in the reaction. When the reaction product is tetrafluorothiirane (i.e., when the starting thiocarbonyl compound is thiocarbonyl fluoride), it is difficult to separate it from the perfluorocyclobutane by fractionation because of the closeness of their boiling points. In this case, vapor phase chromatography over a long column is advantageously used. For some applications, such as the preparation of polymers, it is not essential to separate the tetrafluorothiirane from the perfluorocyclobutane.

Polymers of the 2,2-difluorothiiranes are prepared by subjecting the monomers, alone or mixed with other polymerizable organic compounds, to the influence of certain free radical-producing initiators. One of the most convenient agents for this purpose is ultraviolet light (radiations in the wavelength range of about 1000 to about 4000 A. units) which can be used alone or in conjunction wtih known photosensitizers such as the benzoin alkyl ethers. Other useful free radical-producing agents are the nitrogen fluorides disclosed as polymerization initiators in U.S. Patent 2,963,468, especially dinitrogen difluoride, NF=NF, and the acyl peroxides such as benzoyl peroxide. With initiators of the nitrogen fluoride and peroxide types, the use of an external pressure, e.g., up to 5000 atmospheres, supplied by a gas such as nitrogen, carbon monoxide or helium, is sometimes desirable to facilitate polymerization. It should be noted that the polymerization behavior of the 2,2-difluorothiiranes of this invention is unusual and surprising, in that free radical-induced ring opening and polymerization is an uncommon occurrence with cyclic compounds.

The polymers of the 2,2-difluorothiiranes are essentially linear polymers containing a plurality of

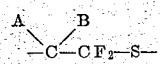

units, where A and B have the previously stated significance. These polymers vary in appearance from viscous oils or semisolids to solids of relatively high melting points. They are characterized by excellent resistance to acids and bases. The polymer of tetrafluorothiirane is particularly outstanding in this respect.

The monomeric 2,2-difluorothiiranes can also be copolymerized with other polymerizable monomers. Thus, for example, two or more of the monomeric 2,2-difluorothiiranes of this invention can be copolymerized together. Other monomers suitable for polymerization include the perfluoro-1-alkenes, preferably those of 2–8 carbon atoms such as tetrafluoroethylene, hexafluoropropylene, perfluoro-1-octene; the polymerizable ethylenic compounds having a terminal methylene group, preferably those of 2–8 carbon atoms, such as the unsaturated hydrocarbons, e.g., propylene, isobutylene; the vinyl esters, e.g., vinyl acetate, vinyl butyrate, vinyl chloride, vinyl fluoride; the acrylic acid esters such as methyl methacrylate, ethyl acrylate; and the thiocarbonyl halides such as thiocarbonyl fluoride or thiocarbonyl chlorofluoride.

Preferably, the copolymers contain at least 5% by weight of polymerized 2,2-difluorothiirane. The preferred copolymers are those obtained from tetrafluorothiirane and one or more polymerizable monomers.

The following examples illustrate the invention in greater detail.

*Example I*

A stainless steel pressure tube of 80 ml. capacity was charged with 10 g. (0.06 mole) of hexafluoropropylene-1,2-epoxide and 6 g. (0.073 mole) of thiocarbonyl fluoride. The tube was brought to a temperature of 200° C. over a period of two hours and maintained at 200° C. for an additional four hours while being shaken mechanically throughout this time. After cooling, the gaseous reaction product was collected and passed through a gas chromatography column packed with silicone oil-impregnated firebrick. In the first fractions thus separated were identified trifluorothioacetyl fluoride and trifluoroacetyl fluoride, as well as unreacted starting materials. Following these was obtained 1.2 g. (15% yield) of tetrafluorothiirane,

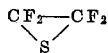

This product is a gas boiling at −10.5±1° C. The frozen product melts at −121° C.

*Analysis.*—Calc'd for $C_2F_4S$: F, 57.53; S, 24.28; mol. wt., 132. Found: F, 58.08; S, 24.18; mol. wit., 130.

The infrared and nuclear magnetic resonance spectra were consistent with the assigned structure.

*Example II*

A stainless steel tube of 400 ml. capacity was charged with 104 g. of hexafluoropropylene-1,2-epoxide of 78% purity and 70 g. of thiocarbonyl fluoride of 88% purity. The tube was heated with shaking over a 2-hour period to 180° C. and held at that temperature for two hours more. Low temperature fractionation of the reaction product gave about 32 g. (50% yield) of tetrafluorothiirane.

*Example III*

Tetrafluorothiirane was prepared at atmospheric pressure by passing 142 g. of an approximately equimolar mixture of hexafluoropropylene-1,2-epoxide and of thiocarbonyl fluoride through a borosilicate glass tube heated at 300–320° C. over a period of 390 minutes. The effluent gas was condensed in traps cooled in liquid nitrogen. Tetrafluorothiirane was isolated upon passing the condensate through a gas chromatography column.

*Example IV*

A mixture of 50.6 g. (0.38 mole) of trifluorothioacetyl fluoride and 89 g. (0.5 mole) of hexafluoropropylene-1,2-epoxide of 93% purity was heated at 175° C. for 6 hours in an agitated stainless steel bomb. The reaction product was collected in cold traps and distilled (B.P. 0–25° C.). The center cut, B.P. 14° C., was essentially pure 2,2,3-trifluoro-3-trifluoromethylthiirane, or hexafluoropropylene-1,2-episulfide,

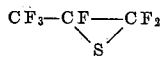

*Analysis.*—Calc'd for $C_3F_6S$: F, 62.60; S, 17.61; M.W., 182.1. Found: F, 62.74; S, 17.44; M.W., 183.8.

The infrared and nuclear magnetic resonance spectra were consistent with the assigned structure.

Purification of the entire distillate by preparative gas chromatography gave 29.5 g. (42.5% yield) of 2,2,3-trifluoro-3-trifluoromethylthiirane.

*Example V*

A mixture of 20 g. (0.2 mole) of thiocarbonyl chlorofluoride and 50 g. (0.3 mole) of hexafluoropropylene-1,2-epoxide was placed in a bomb of 145 ml. capacity and the bomb was heated at 180° C. for 2 hours with shaking. A total of 59 g. of volatile products (B.P. below 20° C.) was recovered along with 8 g. of material boiling above 20° C. This liquid was subjected to gas-liquid chromatography and the largest peak isolated (20–30% of the total) was found to consist of 2,2,3-trifluoro-3-chlorothiirane, or chlorotrifluoroethylene episulfide,

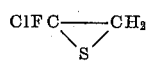

a colorless liquid boiling at about 30° C.

*Analysis.*—Calc'd for $C_2ClF_3S$: 23.88; F, 38.38; S, 21.60. Found: Cl, 23.82; F, 38.12; S, 21.08.

The nuclear magnetic resonance spectrum supported the assigned structure.

*Example VI*

A mixture of 12 g. (0.066 mole) of hexafluorothioacetone and 50 g. (0.3 mole) of hexafluoropropylene-1,2-epoxide was passed over a 65-minute period at atmospheric pressure through a ½-inch platinum tube heated at 300° C. over a 12-inch length. The contact time in the hot zone was about eight seconds.

The liquid reaction products, boiling above room temperature, were collected and subjected to fractional distillation. This gave a fraction (I) boiling at 42–43.5° C. and a second fraction (II) boiling at 107° C. Fraction (I) was found to consist of 2,2-difluoro-3,3-di(trifluoromethyl)thiirane, or perfluoroisobutylene episulfide,

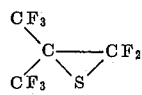

*Analysis.*—Calc'd for $C_4F_8S$: C, 20.71; F, 65.52; S, 13.82. Found: C, 21.07; F, 65.40; S, 13.51.

The nuclear magnetic resonance spectrum supported the assignad structure.

Fraction (II) was the hexafluoroacetone dimer, tetrakis(trifluoromethyl)-1,3-dithietane,

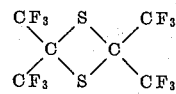

This by-product was undoubtedly formed by spontaneous dimerization at room temperature of part of the hexafluoroacetone in the reservoir holding it prior to passage through the hot reaction zone.

The yield of 2,2-difluoro-3,3-di(trifluoromethyl)-thiirane, based on the non-dimerized hexafluoroacetone, was 56%.

*Example VII*

A sample of tetrafluorothiirane was sealed in a glass tube and irradiated for two days with ultraviolet light emitted by two commercial "sun-lamps." At the end of this time the gas had been converted to a white solid polymer. This polymer was pressed at 190° C. to form a tough, opaque film which was orientable by drawing and could be folded repeatedly without breaking. The film had a crystalline melting point (first transition temperature) of 174–176° C. It was unaffected by contact with concentrated nitric acid at 80° C. for two hours or with triethylamine under the same conditions.

The ultraviolet light-initiated polymerization of tetrafluorothiirane is accelerated when a catalytic amount of benzoin methyl ether is mixed with the monomer.

Example VIII

A mixture of 10 g. of tetrafluorothiirane and 3 mg. of dinitrogen difluoride (50/50 mixture of cis and trans isomers) was sealed in a small, thin-walled platinum tube. The tube was placed in a bomb in which nitrogen was introduced to a pressure of 500 atmospheres. The bomb was heated to 50° C. over a period of two hours. After maintaining the temperature and pressure for an additional four hours the tube was opened. Tetrafluorothiirane polymer of melting point 172.5–173.5° C. was obtained in essentially quantitative yield.

*Analysis.*—Calc'd for $C_2F_4S$: C, 18.18; F, 57.53; S, 24.28. Found: C, 18.24; F, 57.61; S, 24.51.

Example IX

A mixture of 3 g. of tetrafluorothiirane and 3 mg. of trans dinitrogen difluoride in 1 ml. of perfluoro-(dimethylcyclobutane) as the solvent was sealed in a platinum tube and the tube was heated for 8 hours at 70° C. under a nitrogen pressure of 3000 atmospheres. There was obtained an essentially quantitative yield of tetrafluorothiirane polymer, which was pressed to tough, flexible films at 200° C. and 10,000 p.s.i.

Similar results were obtained when octafluorodithiane was used as the inert polymerization medium.

Example X

A mixture of 1.5 g. of tetrafluorothiirane and 3 mg. of benzoyl peroxide was sealed in a platinum tube and heated for 10 hours at 70° C. under a nitrogen pressure of 3000 atmospheres. A tetrafluorothiirane polymer having properties similar to those of the polymers of Examples VII–IX was obtained, though in lower conversion.

Example XI

A mixture of 1.5 g. of tetrafluorothiirane, 1.5 g. of tetrafluoroethylene, 3 mg. of trans dinitrogen difluoride and 1 ml. of perfluoro(dimethylcyclobutane) was subjected to polymerization under the conditions of Example IX except that the heating period at 70° C. was 4 hours. There was obtained 0.85 g. of a tetrafluorothiirane/tetrafluoroethylene copolymer containing 15.64% of sulfur and having a first order transition temperature of about 240° C.

This experiment was repeated except that the monomer mixture consisted of 0.8 g. of tetrafluorothiirane and 1 g. of tetrafluoroethylene. There was obtained 1 g. of a tetrafluorothiirane/tetrafluoroethylene copolymer containing 3.71% of sulfur and having a first order transition temperature of 260–265° C.

Example XII

A mixture of equal volumes of tetrafluorothiirane and ethyl acrylate containing a trace of benzoin methyl ether was sealed in a glass tube and exposed to the ultraviolet radiation of two sun-lamps at a distance of 2 inches for 1 hour and 55 minutes. The resultant tetrafluorothiirane/ethyl acrylate copolymer was dried for 2 hour at room temperature and 0.1 mm. pressure. It contained 1.43% of sulfur.

Example XIII

A mixture of 3.2 g. of tetrafluorothiirane, 0.9 g. of vinyl acetate and 20 mg. of benzoin methyl ether was placed in a glass tube and degassed, the tube was sealed in vacuo, and exposed to the radiation from a sun-lamp at a distance of 18 inches for 1 hour and 5 minutes. After cooling the tube, the unreacted monomers were removed by distillation. The soft, sticky residue was dissolved in 5 ml. of chloroform, the viscous solution was filtered, and the filtrate poured into 500 ml. of methanol. The precipitated tetrafluorothiirane/vinyl acetate copolymer was dried at room temperature and 0.1 mm. pressure for 24 hours. It contained 13.20% of sulfur.

Example XIV

A mixture of 0.43 g. of 2,2,3-trifluoro-3-chlorothiirane and 3 mg. of trans dinitrogen difluoride was sealed in a platinum tube and the tube was heated for 10 hours at 70° C. under a 3000 atmosphere pressure. A viscous, oily polymer was obtained in about 50% conversion.

Example XV

A mixture of 3 g. of tetrafluorothiirane, 0.95 g. of propylene and 3 mg. of trans dinitrogen difluoride was heated at 70° C. for 8 hours under a pressure of 80 atmospheres. The polymeric reaction product was dissolved in 25 ml. of xylene at room temperature and the polymer was reprecipitated by slowly pouring the xylene solution into 200 ml. of methanol. The precipitate was dried for 56 hours at ambient temperature under a pressure of 0.2 mm. There was thus obtained 1.76 g. of a tetrafluorothiirane/propylene copolymer containing 19.4% of sulfur.

Examples of other 2,2-difluorothiiranes which can be prepared by reacting hexafluoropropylene-1,2-epoxide with the appropriate thiocarbonyl compound by the general procedure described above are:

2,2-difluoro-3,3-dichlorothiirane,

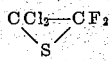

2,2-difluoro-3-chloro-3-trifluoromethylthiirane,

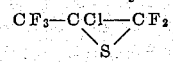

2,2-difluoro 3 chloro-3-perfluoropropylthiirane,

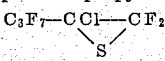

2,2-difluoro-3-chloro-3-(ω-chloroperfluoroethyl)thiirane,

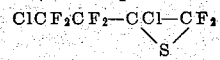

2,2-difluoro-3-chloro-3-(ω-hydroperfluorohexyl)thiirane,

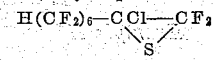

2,2,3-trifluoro-3-perfluoroethylthiirane,

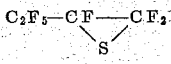

2,2,3-trifluoro-3-perfluorohexylthiirane,

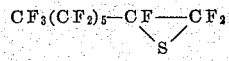

2,2,3-trifluoro-3-(chlorodifluoromethyl)thiirane,

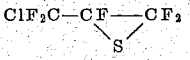

2,2,3-trifluoro-3-(ω-chloroperfluoropropyl)thiirane,

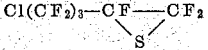

2,2,3-trifluoro-3-difluoromethylthiirane,

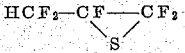

2,2,3-trifluoro-3-(ω-hydroperfluorobutyl)thiirane,

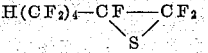

2,2-difluoro-3-trifluoromethyl-3-perfluorohexylthiirane

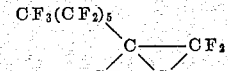

2,2-difluoro-3,3-bis(perfluoropropyl)thiirane,

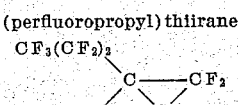

2,2-difluoro-3-trifluoromethyl-3-(ω-chloroperfluoroethyl)-
thiirane

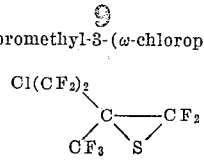

2,2-difluoro-3-trifluoromethyl-3-(ω-hydroperfluoroethyl)-
thiirane,

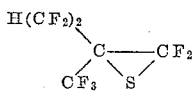

These and other monomeric 2,2-difluorothiiranes of the general formula set forth above can be polymerized, alone or in admixture with polymerizable monomers, by the previously described procedures. These polymers have many valuable uses. As has been shown, they can be formed into self-supporting films, useful for packaging and wrapping purposes, especially for protection against corrosive or noxious environment such as acid or alkaline fumes or vapors. The polymers are also useful as components of waxes and as softeners or plasticizers for high melting polymers such as polytetrafluoroethylene. They are further useful as impregnating agents for porous materials such as paper, cardboard, natural or synthetic fibers or fabrics, wood, brick, etc., imparting to the impregnated articles desirable properties such as water-repellency; and as protective coatings for non-porous surfaces such as glass, plastics or metals, e.g., steel, aluminum or copper. In these applications, the 2,2-difluorothiirane polymers offer the special advantage of high resistance to combustion.

Besides serving as starting materials for valuable polymers, the monomeric 2,2-difluorothiiranes of this invention are per se useful in other applications. For example, the lower boiling 2,2-difluorothiiranes are useful in refrigerant systems, while the higher boiling ones are useful as fire-extinguishing liquids.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A 2,2-difluorothiirane of the formula

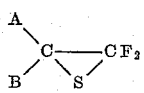

wherein A and B represent members of the class consisting of fluorine, chlorine, perfluoroalkyl of 1 to 6 carbon atoms, ω-chloroperfluoroalkyl of 1 to 6 carbon atoms and ω-hydroperfluoroalkyl of 1 to 6 carbon atoms.

2. Tetrafluorothiirane.
3. 2,2,3-trifluoro-3-trifluoromethylthiirane.
4. 2,2,3-trifluoro-3-chlorothiirane.
5. 2,2-difluoro-3,3-di(trifluoromethyl)thiirane.
6. Homopolymers of the 2,2-difluorothiiranes of the formula

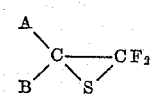

wherein A and B represent members of the class consisting of fluorine, chlorine, perfluoroalkyl of 1 to 6 carbon atoms, ω-chloroperfluoroalkyl of 1 to 6 carbon atoms and ω-hydroperfluoroalkyl of 1 to 6 carbon atoms.

7. Polymers of claim 6 in the form of self-supporting films.
8. Homopolymers of tetrafluorothiirane.
9. Polymers of claim 8 in the form of a self-supporting film.
10. Process for preparing monomeric 2,2-difluorothiiranes of the formula

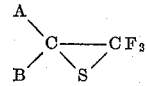

wherein A and B represent members of the class consisting of fluorine, chlorine, perfluoroalkyl, ω-chloroperfluoroalkyl and ω-hydroperfluoroalkyl which comprises bringing in contact, at a temperature of from 150° to 500° C., hexafluoropropylene-1,2-epoxide and a thiocarbonyl compound of the formula

wherein A and B have the same significance as above, and recovering the resulting 2,2-difluorothiiranes.

11. Process for preparing tetrafluorothiirane which comprises bringing in contact, at a temperature of from 150° to 500° C., hexafluoropropylene-1,2-epoxide and thiocarbonyl fluoride and recovering the resulting tetrafluorothiirane.

References Cited in the file of this patent
UNITED STATES PATENTS

| | | |
|---|---|---|
| 2,439,505 | Chaney | Apr. 13, 1948 |
| 2,451,185 | Whaley | Oct. 12, 1948 |
| 2,594,272 | Kauck et al. | Apr. 29, 1952 |
| 2,700,686 | Dickey et al. | Jan. 25, 1955 |
| 2,724,719 | Markley et al. | Nov. 22, 1955 |
| 2,965,651 | Kosmin | Dec. 20, 1960 |
| 2,980,695 | Middleton | Apr. 18, 1961 |
| 2,992,210 | Gluckman | July 11, 1961 |
| 2,996,484 | Martin | Aug. 15, 1961 |

FOREIGN PATENTS

| | | |
|---|---|---|
| 672,720 | Great Britain | May 28, 1952 |

OTHER REFERENCES

Smith et al.: Ind. Eng. Chemistry, vol. 49, No. 8, pp. 1241–46 (1957), TP 1 A58.

Jiang: Chemical Abstracts, vol. 52 (1958), page 15493, QD1.A51.

Abstract from Hua Hsueh Hsueh Pao, vol. 23 (1957), pp. 330–339.

Lowy et al.: Introduction to Organic Chemistry, Wiley and Sons, New York (1945), pages 213–215.